2 Sheets—Sheet 1.

C. M. STEVENS.

MEANS FOR ATTACHING CULTIVATOR TEETH.

No. 9,788. Reissued July 5, 1881.

Witnesses;
Walter Fowler,
A O Behel

Inventor;
Clark M. Stevens,
Per Jacob Behel
Atty.

N. PETERS, Photo-Lithographer, Washington, D. C.

2 Sheets—Sheet 2.

C. M. STEVENS.

MEANS FOR ATTACHING CULTIVATOR TEETH.

No. 9,788. Reissued July 5, 1881.

Witnesses;
Walter Fowler
A. O. Behel

Inventor;
Clark M. Stevens
Per Jacob Behel
Atty.

N. PETERS, Photo-Lithographer, Washington, D. C.

UNITED STATES PATENT OFFICE.

CLARK M. STEVENS, OF BERLIN, WISCONSIN.

MEANS FOR ATTACHING CULTIVATOR-TEETH.

SPECIFICATION forming part of Reissued Letters Patent No. 9,788, dated July 5, 1881.

Original No. 236,377, dated January 4, 1881. Application for reissue filed April 21, 1881.

*To all whom it may concern:*

Be it known that I, CLARK M. STEVENS, a citizen of the United States, residing at Berlin, in the county of Green Lake and State of Wisconsin, have invented a new and useful Improvement in Cultivators, of which the following is a specification.

My invention relates to the attachment of slip cultivator-teeth to their beams, and which are usually held in working position on their beams by frictional contact; and the object of my invention is to provide a slip or safety cultivator-tooth, which may be held in its working position sufficiently rigid for the purposes of cultivation, and when subjected to undue strain by meeting rigid obstructions will turn back on its pivotal connection with the beam to override such obstacle, and may be readily readjusted to its proper working position by simply swinging the tooth forward.

My invention consists in a ratchet mechanism suitably mounted on the beam, in which friction is produced by means of a clamping-bolt independent of the tooth; in providing a tooth of such construction as to be pivoted in a free manner upon the same center of the friction mechanism, and capable of an independent forward swinging movement, and in providing the tooth with a pivoted pawl to engage the frictional mechanism, all of which will be hereinafter more fully described, and which are illustrated in the accompanying drawings, in which—

Figure 1:
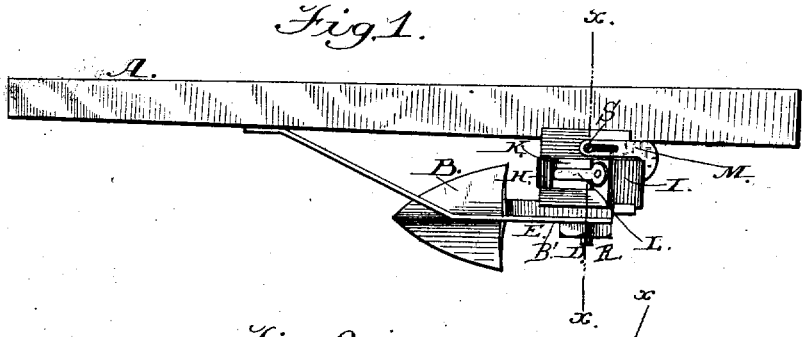
Figure 2:
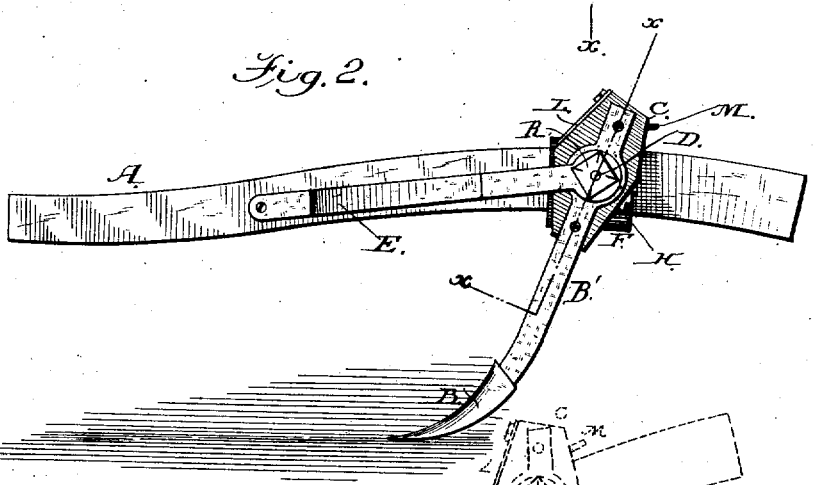
Figure 3:
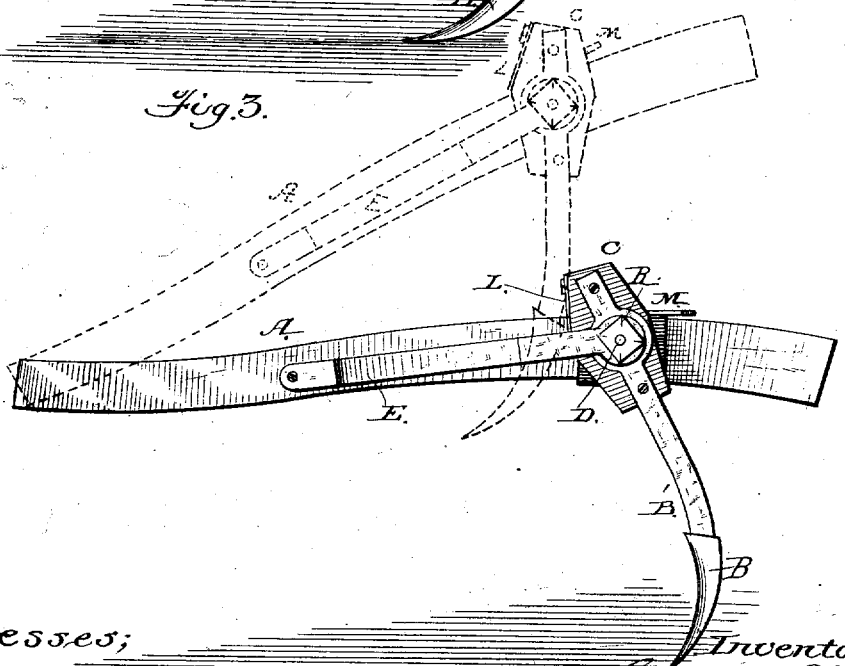
Figure 4:
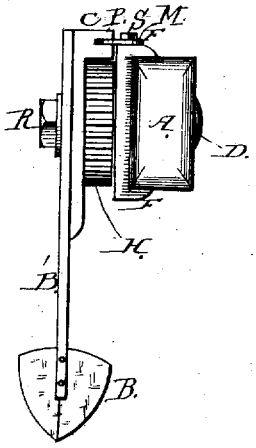
Figure 5:
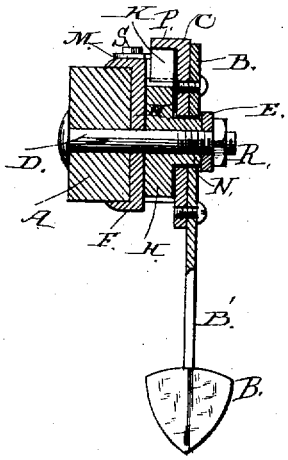
Figure 6:
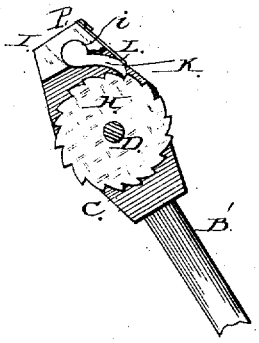

Figure 1 is a plan view of a shovel-beam of a cultivator, with cultivator-shovel thereto attached, embodying my invention, of which Fig. 2 is a side elevation. Fig. 3 is also a side elevation, in which the tooth is represented in its rearward inclined position as having passed an obstruction. Fig. 4 is a rear elevation. Fig. 5 is a transverse section on dotted line $x$, and Fig. 6 is an inner face view of the ratchet mechanism as applied to the shank of the tooth.

In the figures, A represents a cultivator-shovel beam. To the rear portion of this beam is fitted a bed-plate or washer, F, fitted with flanges to embrace the edge portions of the beam, operating to give it firmness. This washer is provided with a central opening, to receive a clamping-bolt, D, which is passed through the beam and washer from the opposite side of the beam.

At H is represented a friction wheel or disk, fitted with a central opening to receive the clamping-bolt D freely. The periphery of this disk is fitted with teeth inclining rearward on its upper portion, producing a saw-toothed ratchet adapted to receive the free end of a pawl. From the outer center of this disk rises a hub, N, designed to receive a cultivator-tooth freely.

At C is represented a bracket fitted to receive the stud N freely, and its upper end portion is fitted with a projecting portion, P, which overhangs the ratchet-disk. In this overhanging projecting portion is suitably pivoted a pawl, K, in such relative position with the friction-disk that its free end will engage the ratchet-teeth on its periphery.

At B is represented a cultivator-shovel. This shovel is fixed to the lower end portion of a shovel shank or standard, B′, the upper end portion of which is securely fixed to the outer face of the bracket C, and this portion of the shank is fitted with a hole to correspond to the hole in the bracket C, to which it is fixed, and is also adapted to freely receive the stud N of the toothed friction-disk. This tooth thus constructed is placed in position on the friction-disk, with the stud N thereof entering the hole in the shank prepared to receive it, and the free end of the pawl to engage the teeth of the friction-disk. The relative thickness of this tooth and the length of the stud are such that the stud will project slightly beyond the tooth.

At E is represented a brace made from bar material, having its rear portion fitted to receive the clamping-bolt, and its forward end is fixed to the beam in any suitable manner.

At R is represented a screw-nut fitted to engage the screw-threaded portion of the clamping-bolt, by means of which the friction-disk may be clamped to the bed-plate with any practical degree of force within the limits of the device, without in any manner clamping the tooth; or it will be seen that the friction mechanism, so far as relates to the action of the clamping-bolt, is independent of the tooth, and by means of the washer-like end of the brace E the friction-disk may be turned in either direction without in any manner affecting the action of the screw clamping-bolt. It will also be seen that when the beam is in a working position the action of gravity will operate to hold the free end of the pivoted pawl in contact with the teeth of the ratchet-disk.

At L is represented a spring of plate form fixed to the tooth in such relative position to the pivoted pawl that its free end will overlap the free end portion of the pivoted pawl, operating to assist the pawl to engage the ratchet-teeth of the disk.

At M is represented an adjustable stop, consisting of a hook-plate fixed to the beam or bed-plate mounted thereon, and in such relative position with the tooth that its hook portion shall engage the rear edge of the tooth, operating to limit the inclination thereof. The forward portion of this hook-plate is provided with a lengthwise slot adapted to receive a clamping-bolt, S, employed to fix the hook-plate to the beam in such a manner as to be adjustable lengthwise thereon, to vary the angle of the tooth relatively with the beam and limit its forward swinging movement.

In the foregoing I have only represented such parts of a cultivator as are necessary to show my improvements in connection therewith.

The stop is adjusted and clamped in position to limit the forward swinging movement of the shovel to the proper angle relatively with the beam, for the purpose of cultivation, in which position the free end of the pawl pivoted to the upper portion of the tooth will engage the teeth of the ratchet-disk to prevent the tooth swinging backward. Then, by means of the screw-nut R, the toothed friction-disk is clamped to the bed-plate with a force to produce friction, to hold the tooth with a force sufficient for the purposes of cultivation, but in such a manner as to render and permit the shovel to turn back to override obstructions when subjected to undue strain, or to a resistance greater than the parts would sustain safely. After the tooth has been carried back, as represented in Fig. 3, and the obstruction has been passed, the shovel may be returned to its working position by raising the free end of the beam, as represented in the dotted lines, in which position the pawl will engage the teeth of the ratchet to hold the tooth in working position; or it may be returned to its working position by raising the beam sufficiently to permit the tooth to be swung forward by means of the hand or foot of the operator, and in every such instance the pawl will engage the ratchet and operate to hold the tooth in working position.

I claim as my invention—

1. The combination, with a loosely-pivoted cultivator-tooth, of a friction device having the same center as that of the cultivator-tooth, and a pawl and ratchet for connecting the loosely-pivoted cultivator-tooth and friction device, substantially as set forth.

2. The combination, with a loosely-pivoted cultivator-tooth, a friction device having the same center as that of the pivot of the cultivator-tooth, and a pawl and ratchet connecting the loosely-pivoted cultivator-tooth and friction device, of an adjustable stop for limiting the forward movement of the tooth, substantially as set forth.

3. The combination, with a cultivator-beam, a friction device, and a clamping-bolt for securing the friction device to the beam at any desired degree of frictional contact therewith, of a cultivator-tooth loosely pivoted on the same center as the friction device, and a pawl and ratchet for connecting the loosely-pivoted cultivator-tooth and friction device, substantially as set forth.

4. The combination, with a ratchet and clamping-bolt for securing the ratchet in a varied degree of frictional contact, of the cultivator-tooth standard loosely pivoted, so as to freely move in one direction, and a pawl pivoted to the standard and arranged to engage with said ratchet for retaining the tooth against movement in the opposite direction by the frictional engagement of the ratchet, substantially as set forth.

5. The combination, with a cultivator-beam, a ratchet, and clamping-bolt for retaining the ratchet against rotation under any desired frictional engagement, of a loosely-pivoted cultivator-tooth, a pawl connecting the tooth-standard and ratchet, and spring engaging with said pawl, substantially as set forth.

6. The combination, with a cultivator-beam, a ratchet, and clamping-bolt for securing the ratchet to the beam and against rotary movement by frictional contact, of a cultivator-tooth standard loosely pivoted upon a bearing formed on the ratchet, and a pawl connecting the standard and ratchet, substantially as set forth.

CLARK M. STEVENS.

Witnesses:
HORACE MINER,
J. M. HUNT.